(12) United States Patent
Kitahara

(10) Patent No.: US 8,590,368 B2
(45) Date of Patent: Nov. 26, 2013

(54) AIRFLOW MEASURING DEVICE

(75) Inventor: Noboru Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 8 days.

(21) Appl. No.: 13/495,127

(22) Filed: Jun. 13, 2012

(65) Prior Publication Data

US 2013/0014572 A1    Jan. 17, 2013

(30) Foreign Application Priority Data

Jul. 16, 2011   (JP) .................................. 2011-157260

(51) Int. Cl.
*G01M 15/04* (2006.01)

(52) U.S. Cl.
USPC ................... 73/114.32; 73/114.34; 73/204.31; 73/204.22

(58) Field of Classification Search
USPC ................. 73/114.32, 114.34, 204.21, 204.22
See application file for complete search history.

(56) References Cited

U.S. PATENT DOCUMENTS

| | | | |
|---|---|---|---|
| 7,654,134 B2 * | 2/2010 | Enomoto et al. ............ | 73/114.32 |
| 7,748,268 B2 * | 7/2010 | Lull et al. .................... | 73/204.22 |
| 8,181,514 B2 * | 5/2012 | Ariyoshi et al. ............. | 73/202.5 |
| 8,191,417 B2 * | 6/2012 | Ariyoshi et al. ............. | 73/202.5 |
| 8,205,493 B2 * | 6/2012 | Mais et al. ................... | 73/202.5 |
| 8,347,706 B2 * | 1/2013 | Okamoto et al. ............ | 73/202.5 |
| 2012/0103086 A1 * | 5/2012 | Goka et al. .................. | 73/204.26 |
| 2012/0291519 A1 * | 11/2012 | Kitahara ......................... | 73/1.16 |
| 2012/0291533 A1 * | 11/2012 | Kitahara ..................... | 73/114.32 |
| 2013/0014573 A1 * | 1/2013 | Kamiya et al. ............. | 73/114.32 |
| 2013/0019675 A1 * | 1/2013 | Ban et al. ......................... | 73/202 |
| 2013/0055800 A1 * | 3/2013 | Kitahara et al. ............ | 73/114.32 |

FOREIGN PATENT DOCUMENTS

DE    102008042807    10/2008

* cited by examiner

*Primary Examiner* — Freddie Kirkland, III

(57) ABSTRACT

An airflow measuring device has a bypass passage accommodating a thermal-type sensor configured to conduct heat transfer with air. A mainstream of intake air partially flows through the bypass passage and flows out of an outlet, as an after-bypass-passage flow. The mainstream partially flows along the outer surface of the airflow measuring device, without passing through the bypass passage, as an outside-passage flow. The outer surface of the airflow measuring device defines a throttle at the downstream of the outlet. The throttle merges the after-bypass-passage flow with the outside-passage flow and guides the merged flow to the downstream.

8 Claims, 5 Drawing Sheets

UPSTREAM ←——→ DOWNSTREAM
MAINSTREAM

UPSTREAM ⇌ DOWNSTREAM
MAINSTREAM

UPSTREAM ⇄ DOWNSTREAM
MAINSTREAM

UPSTREAM ⇄ DOWNSTREAM
MAINSTREAM

UPSTREAM ⇌ DOWNSTREAM
MAINSTREAM

← AFTER-BYPASS-PASSAGE FLOW
← OUTSIDE-PASSAGE FLOW

UPSTREAM ⇌ DOWNSTREAM
MAINSTREAM

UPSTREAM ←——→ DOWNSTREAM
MAINSTREAM

UPSTREAM ←——→ DOWNSTREAM
MAINSTREAM

UPSTREAM ⇄ DOWNSTREAM
MAINSTREAM

UPSTREAM ⇄ DOWNSTREAM
MAINSTREAM

AIRFLOW MEASURING DEVICE

CROSS REFERENCE TO RELATED APPLICATION

This application is based on reference Japanese Patent Application No. 2011-157260 filed on Jul. 16, 2011, the disclosure of which is incorporated herein by reference.

TECHNICAL FIELD

The present disclosure relates to an airflow measuring device configured to measure a flow rate of air.

BACKGROUND

Conventionally, a known thermal-type airflow measuring device is employed for measuring a flow rate of air by utilizing heat transfer with air. Such a conventional airflow measuring device is, for example, equipped to an air intake passage of an internal combustion engine for measuring a flow rate (intake air amount) of intake air drawn into the internal combustion engine.

Specifically, for example, an airflow measuring device receives a part of air-intake mainstream passing through an air intake passage and sends an electric signal according to the intake air amount. The airflow measuring device includes a case and a sensor chip. The case forms a bypass passage therein to flow air, which enters from the air intake passage, therethrough. The sensor chip generates an electric signal according to heat transfer caused with air flowing through the bypass passage. In the airflow measuring device, the sensor chip is not located directly in the air intake passage, through which the air-intake mainstream passes, but is located in the bypass passage. With this configuration, the airflow measuring device is enabled to obtain a detection result with a small fluctuation, without being exerted directly with an influence of turbulence of the air-intake mainstream passing through the air intake passage.

The air-intake mainstream causes pulsation inevitably due to opening and closing operation of a valve equipped to the internal combustion engine. Therefore, the intake air amount fluctuates between the peak values of the pulsation. As described above, the airflow measuring device employs the thermal-type measuring configuration to obtain detection value by utilizing heat transfer with air. Inherently, because of the thermal-type measuring configuration, the detection value of the airflow measuring device becomes lower than the center of the pulsation representing the true value of the intake air amount. Consequently, the detection value of the airflow measuring device has a detection error in negative value. In consideration of this, the airflow measuring device has a configuration with a predetermined relationship between a passage length L2 of the bypass passage and a passage length L1 of the air intake passage, through which air flows straight without passing through the bypass passage. Specifically, the passage length L2 is set to be greater than the passage length L1 thereby to set a bias width of the detection value corresponding to a value L2/L1. In this way, the detection value is biased, i.e., increased by the bias width to reduce the detection error in negative value.

It is noted that, the detection error in negative value varies correspondingly to the intake air amount. Specifically, the detection error in negative value increases in degree, i.e., the detection error in negative value decreases in value, as the intake air amount increases. It is conceivable to set the value L2/L1 so that the detection error in negative value becomes zero when the intake air amount is a specific large value. Nevertheless, in this case, when the intake air amount decreases from the specific large value, the bias width corresponding to the value L2/L1 may be excessively large, while the detection error in negative value decreases. Consequently, the decreased detection error in negative value is cancelled with the excessive bias width to cause a detection error in positive value in the detection value.

Therefore, when a flow rate of a pulsating flow is measured with a thermal-type airflow measuring device, an error cancelable range exists in the detection range of flow rate, corresponding to the value L2/L1. Within the error cancelable range, detection error in negative value and detection error in positive value can be cancelled, without excess and deficiency. That is, when the flow rate decreases below the error cancelable range, detection error in positive value may occur in the detection value.

An airflow measuring device of DE 10 2008 042 807 A1 (Patent Document 1) has a configuration to restrain a swirl flow from occurring along the outer wall surface of a case at the downstream of an outlet of a bypass passage. Specifically, in Patent Document 1, the outer wall surface of the case of the airflow measuring device is equipped with two ribs. The two ribs are in parallel with the mainstream of intake air and surround the outlet of the bypass passage. A lid is further provided at the downstream of the outlet to bridge the two ribs. According to Patent Document 1, a swirl flow can be restrained to rectify flow along the outer wall surface of the case at the downstream of the outlet. The configuration of Patent Document 1 may restrain occurrence of a swirl flow, nevertheless, Patent Document 1 cannot address the detection error in positive value caused by decrease in intake air amount.

SUMMARY

It is an object of the present disclosure to produce a thermal-type airflow measuring device configured to measure a pulsating flow and to restrain occurrence of a detection error in positive value even when a flow rate decreases below the error cancelable range.

According to an aspect of the present disclosure, an airflow measuring device is located at an air intake passage, which is configured to flow a mainstream of intake air therethrough toward an internal combustion engine. The airflow measuring device is configured to receive a part of the mainstream and to send an electric signal according to a flow rate of the mainstream. The airflow measuring device comprises a case having a bypass passage configured to pass received intake air therethrough. The airflow measuring device further comprises a sensor located in the bypass passage and configured to conduct heat transfer with the received intake air to generate the electric signal. The bypass passage is configured to flow a part of the mainstream therethrough and further to flow the part of the mainstream out of an outlet, as an after-bypass-passage flow. The case has an outer wall surface configured to flow a part of the mainstream therealong, without passing through the bypass passage, as an outside-passage flow. The outer wall surface of the case defines a throttle at a downstream of an opening of the outlet of the bypass passage relative to the mainstream. The throttle is configured to merge the after-bypass-passage flow with the outside-passage flow to generate a merged flow and to guide the merged flow to a downstream of the mainstream.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Configuration of First Embodiment

Figure 1:
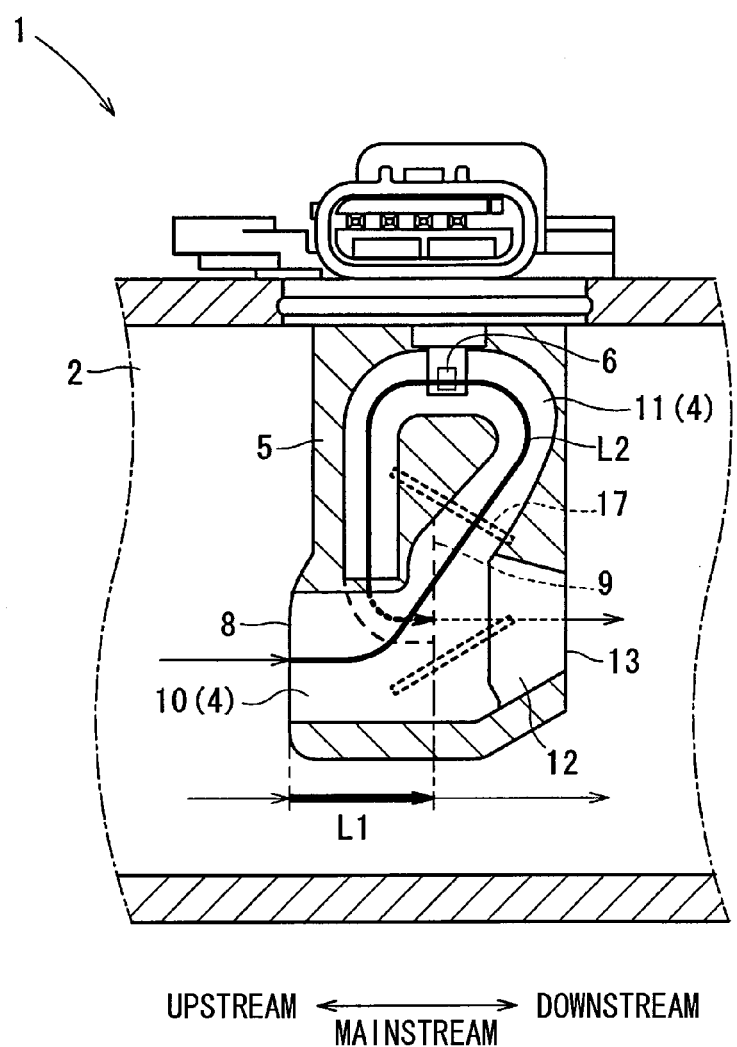
FIG. 1 is a schematic sectional view showing an airflow measuring device according to the first embodiment.
Figure 2A:
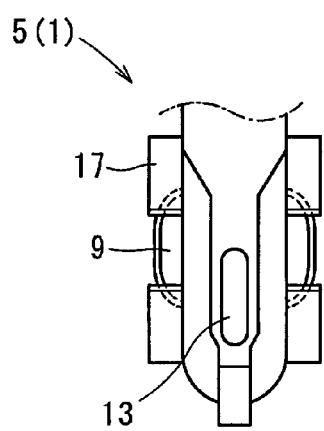
FIG. 2A is a schematic rear view showing the airflow measuring device according to the first embodiment.
Figure 2B:
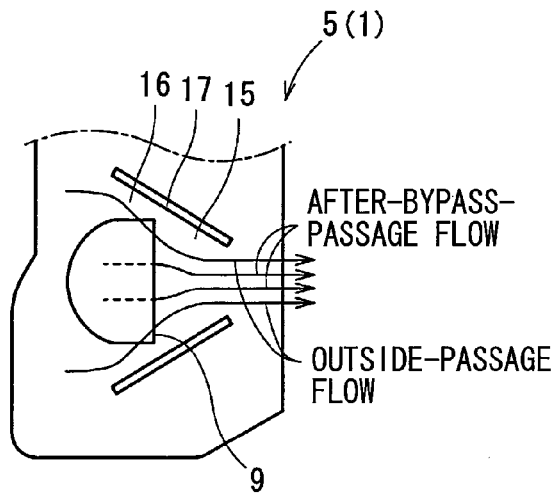
FIG. 2B is a schematic side view showing the airflow measuring device.

Configuration of an airflow measuring device 1 according to the first embodiment will be described with reference to FIG. 1, FIG. 2A, and FIG. 2B. The airflow measuring device 1 has an internal heat transfer configuration to measure a flow rate of air. The airflow measuring device 1 is equipped to, for example, an air intake passage 2 connected to an internal combustion engine (not shown) and configured to measure the flow rate of air (intake air amount) drawn into the internal combustion engine.

Specifically, the airflow measuring device 1 is located at the air intake passage 2 to receive a part of air-intake mainstream. The airflow measuring device 1 sends an electric signal according to the intake air amount. The airflow measuring device 1 includes a case 5 and a sensor chip 6. The case 5 forms a bypass passage 4 therein to flow air, which enters from the air intake passage 2, therethrough. The sensor chip 6 generates an electric signal according to heat transfer caused with air flowing through the bypass passage 4. The electric signal generated with the sensor chip 6 is implemented with a predetermined processing and is sent to an electronic control unit (not shown) outside the airflow measuring device 1. The electronic control unit utilizes the processed signal for various controls such as a fuel injection control.

The bypass passage 4 includes an inlet 8, two outlets 9, a straight passage 10, and a round passage 11. The inlet 8 opens in the air intake passage 2 toward the upstream of the air-intake mainstream. The two outlets 9 open in the air intake passage 2 toward the downstream of the air-intake mainstream. The straight passage 10 linearly extends in the case 5 to guide intake air straight from the inlet 8 in the same direction as the flow direction of the air-intake mainstream in the air intake passage 2. The round passage 11 guides intake air, which flows straight through the straight passage 10, and further guides the air toward the two outlets 9. With the present configuration, the passage length L2 of intake air flowing through the bypass passage 4 is greater than the passage length L1 of intake air flowing straight through the air intake passage 2 without passing through the bypass passage 4.

The straight passage 10 linearly connects with a dust exhaust passage 12 for exhausting dust. The dust exhaust passage 12 has a downstream end defining a dust exhaust port 13 opening in the air intake passage 2 toward the downstream of the air-intake mainstream. The sensor chip 6 is located in a bottom area of the round passage 11 and is projected from the most distant position from the straight passage 10. The round passage 11 branches into two passages at the downstream and directed toward the two outlets 9, respectively. At the position where the sensor chip 6 is located in the round passage 11, air flows in a flow direction opposite to the flow direction of air in the straight passage 10 and the flow of the air-intake mainstream in the air intake passage 2.

In the above-described airflow measuring device 1, the sensor chip 6 is not located directly in the air intake passage 2, through which the air-intake mainstream passes, but is located in the bypass passage 4. With the present configuration, the airflow measuring device 1 is enabled to obtain a detection result with a small fluctuation, without being exerted directly with an influence of turbulence of the air-intake mainstream passing through the air intake passage 2. In addition, the airflow measuring device 1 has the round passage 11 and the like to secure the elongated passage length L2 compared with the passage length L1. The value L2/L1 is set to add a bias width to raise the detection value thereby to avoid measurement of low flow rate caused by pulsating flow.

Detailed configuration of the airflow measuring device 1 according to the first embodiment will be described more specifically with reference to FIG. 1, FIG. 2A, and FIG. 2B. The case 5 of the airflow measuring device 1 has the outer wall surfaces on both sides each defining a throttle 15. The throttle 15 is located at the downstream of the opening of the outlet 9 of the bypass passage 4 relative to the air-intake mainstream. The air-intake mainstream partially flows into the case 5 to pass through the bypass passage 4 and further flows out of the outlet 9, as an after-bypass-passage flow. In addition, the air-intake mainstream partially flows along the outer wall surface of the case 5, without passing through the bypass passage 4, as an outside-passage flow. The throttle 15 merges the after-bypass-passage flow with the outside-passage flow to generate a merged flow and guides the merged flow to the downstream of the air-intake mainstream. Each of the outer wall surfaces of the case 5 further defines an introduction passage 16 at the upstream of the opening of the outlet 9 relative to the air-intake mainstream. The introduction passage 16 guides the outside-passage flow toward the throttle 15 while throttling the outside-passage flow.

Each of the outer wall surfaces of the case 5 is equipped with two projections 17 each being in a linear plate form. The two projections 17 are projected from the outer wall surface of the case 5 to surround the outlet 9 therebetween. The two projections 17 are inclined such that the two projections 17 get closer to each other toward the downstream of the air-intake mainstream. The throttle 15 and the introduction passage 16 are defined with the two projections 17 and the outer wall surface of the case 5. The outer wall surface of the case 5 and the two projections 17 define a partitioned region thereamong, and the partitioned region at the downstream of the opening of the outlet 9 relative to the air-intake mainstream functions as the throttle 15. In the partitioned region functioning as the throttle 15, the after-bypass-passage flow and the outside-passage flow are merged and are throttled. The partitioned region at the upstream of the opening of the outlet 9 relative to the air-intake mainstream functions as the introduction passage 16. In the partitioned region functioning as the introduction passage 16, the outside-passage flow is throttled and is guided into the throttle 15.

Effect of First Embodiment

According to the present first embodiment, the case 5 of the airflow measuring device 1 has the outer wall surfaces on both sides each defining the throttle 15. The throttle 15 is located at the downstream of the opening of the outlet 9 of the bypass passage 4 relative to the air-intake mainstream. The air-intake mainstream partially flows into the case 5 to pass through the bypass passage 4 and further flows out of the outlet 9, as the after-bypass-passage flow. In addition, the air-intake mainstream partially flows along the outer wall surface of the case 5, without passing through the bypass passage 4, as the outside-passage flow. The throttle 15 merges the after-bypass-passage flow with the outside-passage flow to generate the merged flow and guides the merged flow to the downstream of the air-intake mainstream.

As described above, correspondingly to the value L2/L1, the bias width is caused, by which the detection value of the flow rate is raised. According to the above-described configuration of the first embodiment, although the mechanism is still unclear, the bias width caused correspondingly to the value L2/L1 is reduced, as the flow rate decreases below the error cancelable range of the flow rate. Refer to the background about the definition of the error cancelable range. Therefore, even when the intake air amount decreases below the error cancelable range, it is possible to restrain occurrence of detection error in positive value, when measurement of the intake air amount flowing into to the internal combustion engine is implemented by using the thermal-type airflow measuring device 1.

In addition, each of the outer wall surfaces of the case 5 further defines the introduction passage 16 at the upstream of the opening of the outlet 9 relative to the air-intake mainstream. The introduction passage 16 guides the outside-passage flow toward the throttle 15 while throttling the outside-passage flow. With the present configuration, it is further possible to restrain occurrence of detection error in positive value, even when the intake air amount decreases below the error cancelable range.

Second Embodiment

Figure 3:
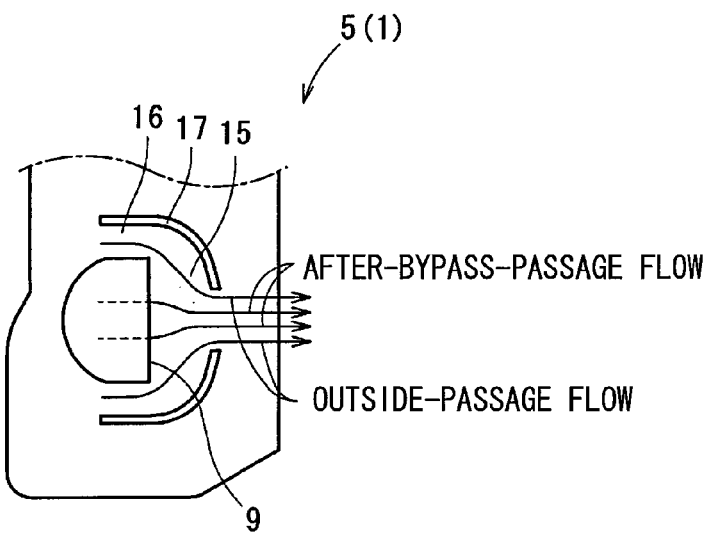
FIG. 3 is a schematic side view showing an airflow measuring device according to the second embodiment.

As shown in FIG. 3, in the airflow measuring device 1 according to the second embodiment, each of the outer wall surfaces of the case 5 is equipped with two projections 17 each being in a curved plate form. The two projections 17 are projected from the outer wall surface of the case 5 to surround the outlet 9 therebetween. The two projections 17 are curved such that the two projections 17 get closer to each other toward the downstream of the air-intake mainstream. The throttle 15 and the introduction passage 16 are defined with the two projections 17 and the outer wall surface of the case 5. The outer wall surface of the case 5 and the two projections 17 define the partitioned region thereamong. The partitioned region at the downstream of the opening of the outlet 9 relative to the air-intake mainstream functions as the throttle 15. The partitioned region at the upstream of the opening of the outlet 9 relative to the air-intake mainstream functions as the introduction passage 16.

Each of the two projections 17 has an upstream portion defining the introduction passage 16. The upstream portion is in a linear shape and is in parallel with the air-intake mainstream. Each of the two projections 17 has a downstream portion defining the throttle 15. The downstream portion is in the convex form and is curved outward relative to the throttle 15 such that the two projections 17 get closer to each other toward the downstream of the air-intake mainstream.

Third Embodiment

Figure 4A:
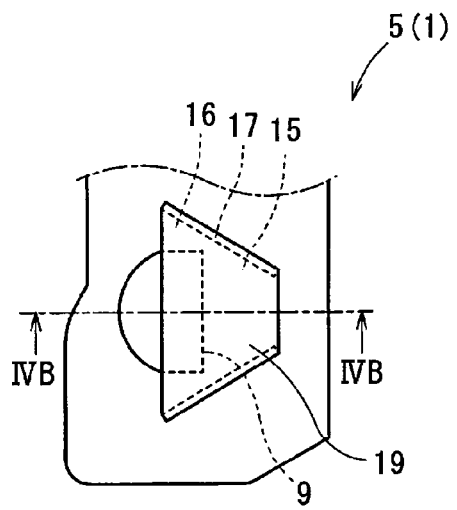
FIG. 4A is a schematic side view showing an airflow measuring device according to the third embodiment.
Figure 4B:
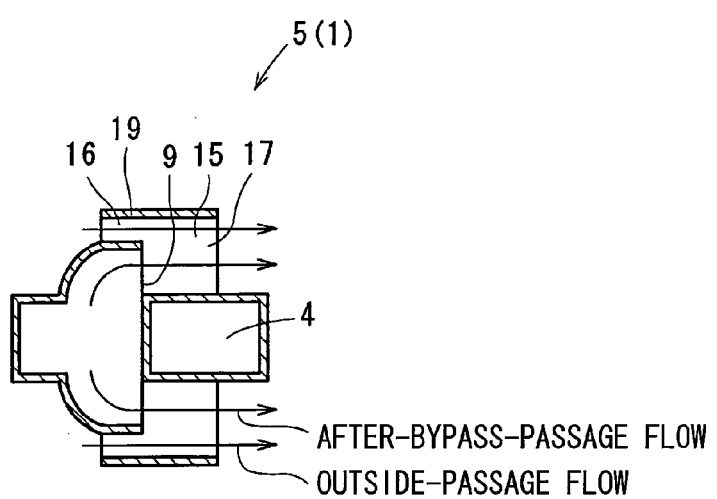
FIG. 4B is a schematic sectional view taken along the line IVB-IVB in FIG. 4A.

As shown in FIG. 4A and FIG. 4B, in the airflow measuring device 1 according to the third embodiment, each of the outer wall surfaces of the case 5 is equipped with two projections 17 similarly to the first embodiment and is further equipped with a lid 19 bridging the two projections 17. The lid 19 is opposed to the outer wall surface of the case 5 and is in parallel with the outer wall surface of the case 5. The outer wall surface of the case 5, the two projections 17, and the lid 19 define the partitioned region thereamong. The partitioned region at the downstream of the opening of the outlet 9 relative to the air-intake mainstream functions as the throttle 15. The partitioned region at the upstream of the opening of the outlet 9 relative to the air-intake mainstream functions as the introduction passage 16.

Fourth Embodiment

Figure 5A:
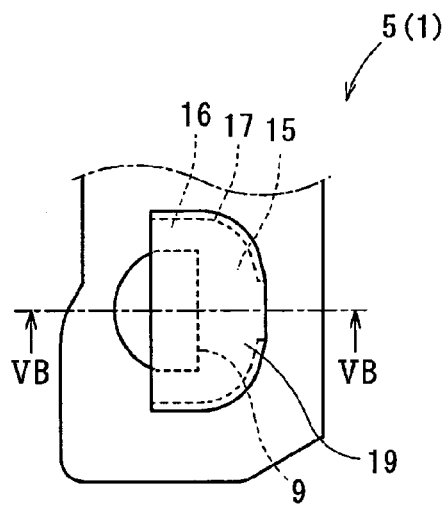
FIG. 5A is a schematic side view showing an airflow measuring device according to the fourth embodiment.
Figure 5B:
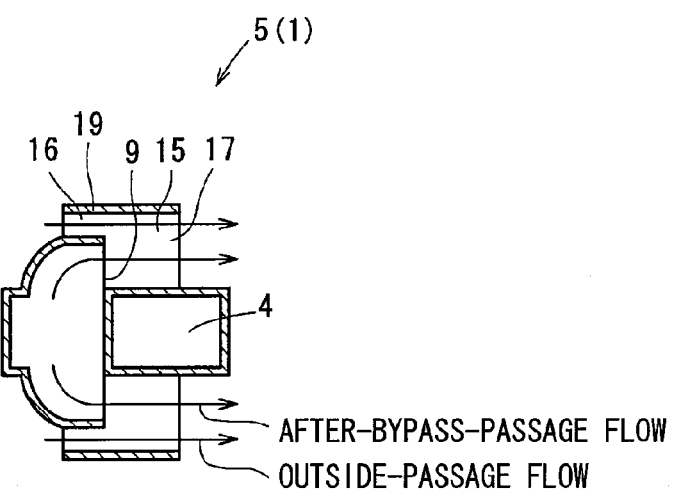
FIG. 5B is a schematic sectional view taken along the line VB-VB in FIG. 5A.

As shown in FIG. 5A and FIG. 5B, in the airflow measuring device 1 according to the fourth embodiment, each of the outer wall surfaces of the case 5 is equipped with two projections 17 similarly to the second embodiment and is further equipped with a lid 19 bridging the two projections 17. The lid 19 is opposed to the outer wall surface of the case 5 and is in parallel with the outer wall surface of the case 5. The outer wall surface of the case 5, the two projections 17, and the lid 19 define the partitioned region thereamong. The partitioned region at the downstream of the opening of the outlet 9 relative to the air-intake mainstream functions as the throttle 15. The partitioned region at the upstream of the opening of the outlet 9 relative to the air-intake mainstream functions as the introduction passage 16.

Fifth Embodiment

Figure 6A:
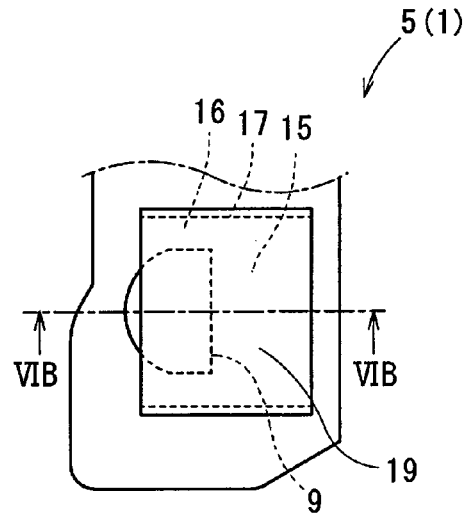
FIG. 6A is a schematic side view showing an airflow measuring device according to the fifth embodiment.
Figure 6B:
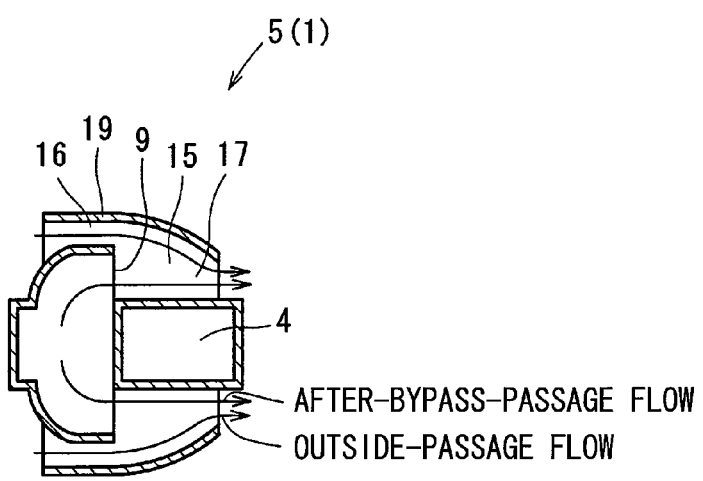
FIG. 6B is a schematic sectional view taken along the line VIB-VIB in FIG. 6A.

As shown in FIG. 6A and FIG. 6B, in the airflow measuring device 1 according to the fifth embodiment, each of the outer wall surfaces of the case 5 is equipped with two projections 17 and is further equipped with a lid 19 bridging the two projections 17. Each of the two projections 17 is in parallel with the air-intake mainstream. The lid 19 is opposed to the outer wall surface of the case 5. The lid 19 has a downstream portion at the downstream of the opening of the outlet 9 relative to the air-intake mainstream. The downstream portion is in a curved plate form such that the lid 19 gets closer to the outer wall surface of the case 5 toward the downstream of the air-intake mainstream.

The outer wall surface of the case 5, the two projections 17, and the lid 19 define the partitioned region thereamong. The partitioned region at the downstream of the opening of the outlet 9 relative to the air-intake mainstream functions as the throttle 15. The partitioned region at the upstream of the opening of the outlet 9 relative to the air-intake mainstream functions as the introduction passage 16. The downstream portion of the lid 19 defining the throttle 15 is in the convex form and is curved outward relative to the throttle 15 such that the downstream portion gets closer to the outer wall surface of the case 5 toward the downstream of the air-intake mainstream.

(Modification)

The configuration of the airflow measuring device 1 is not limited to those in the first to fifth embodiments, and various modifications of the airflow measuring device 1 may be conceivable.

For example, in the airflow measuring device 1 according to the first to fifth embodiments, the introduction passage 16 is defined at the upstream of the throttle 15. It is noted that, for example, the two projections 17 may be formed only at the upstream of the opening of the outlet 9 thereby to form only the throttle 15 without forming the introduction passage 16.

In the airflow measuring device 1 according to the third to fifth embodiments, the lid 19 bridges the two projections 17 entirely along the flow direction of the air-intake mainstream. It is noted that, for example, the lid 19 may be formed to bridge the two projections 17 only at the upstream of the opening of the outlet 9.

In the airflow measuring device 1 according to the first to fifth embodiments, the sensor chip 6 is employed as the sensor for detecting the intake air amount. Alternatively, for example, a bobbin formed by winding a platinum wire may be employed as the sensor, instead of the sensor chip 6.

The above-described airflow measuring device is located at the air intake passage, through which the mainstream of intake air drawn into the internal combustion engine flows, the airflow measuring device configured to receive a part of the mainstream and to send the electric signal according to the flow rate of the mainstream. The airflow measuring device includes: the case forming the bypass passage passing the received intake air therethrough; and the sensor accommodated in the bypass passage to conduct heat transfer with the received intake air to generate the electric signal.

The case has the outer wall surface equipped with the throttle at the downstream of the opening of the outlet of the bypass passage relative to the mainstream. The throttle merges the after-bypass-passage flow with the outside-passage flow to generate the merged flow and guides the merged flow to the downstream of the mainstream. The after-bypass-passage flow is a part of the mainstream flowing into the bypass passage and further flowing out of the outlet. The outside-passage flow is a part of the mainstream flowing along the outer wall surface of the case, without passing through the bypass passage.

As described above, correspondingly to the value L2/L1, the bias width is caused, by which the detection value of the flow rate is raised. Nevertheless, with the present configuration, although the mechanism is still unclear, the bias width caused correspondingly to the value L2/L1 is reduced, as the flow rate decreases below the error cancelable range of the flow rate. Therefore, even when the flow rate decreases below the error cancelable range, it is possible to restrain occurrence of detection error in positive value, when measurement of a flow rate of pulsating flow is implemented by using the thermal-type airflow measuring device.

The outer wall surface of the case may be equipped with the introduction passage at the upstream of the opening of the outlet relative to the mainstream. In this case, the introduction passage may guide the outside-passage flow toward the throttle. With the present configuration, it is further possible to restrain occurrence of detection error in positive value, even when the flow rate decreases below the error cancelable range.

The introduction passage may guide the outside-passage flow toward the throttle, while throttling the outside-passage flow. With the present configuration, it is further possible to restrain occurrence of detection error in positive value, even when the flow rate decreases below the error cancelable range.

The throttle may be formed with the two line-shaped projections projected from the outer wall surface of the case. In this case, the after-bypass-passage flow and the outside-passage flow may be merged and may be throttled in the region partitioned with the outer wall surface of the case and the two line-shaped projections.

The throttle and the introduction passage may be formed with the two line-shaped projections projected from the outer wall surface of the case to surround the outlet. In this case, the after-bypass-passage flow and the outside-passage flow may be merged and may be throttled in the region, which is partitioned with the outer wall surface of the case and the two line-shaped projections, at the downstream of the opening of the outlet relative to the mainstream.

A lid may be equipped to bridge the two line-shaped projections and to be opposed to the outer wall surface of the case. In this case, the after-bypass-passage flow and the outside-passage flow may be merged and may be throttled in the region partitioned with the outer wall surface of the case, the two line-shaped projections, and the lid.

The throttle may be formed with the two line-shaped projections being linearly inclined or curved such that the two line-shaped projections get closer to each other toward the downstream of the mainstream.

The throttle may be formed with the lid being linearly inclined or curved such that the lid gets closer to the outer wall surface of the case toward the downstream of the mainstream.

The above structures of the embodiments may be combined as appropriate. While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An airflow measuring device located at an air intake passage, which is configured to flow a mainstream of intake air therethrough toward an internal combustion engine, the airflow measuring device configured to receive a part of the mainstream and to send an electric signal according to a flow rate of the mainstream, the airflow measuring device comprising:
a case having a bypass passage configured to pass received intake air therethrough; and
a sensor located in the bypass passage and configured to conduct heat transfer with the received intake air to generate the electric signal, wherein
the bypass passage is configured to flow a part of the mainstream therethrough and further to flow the part of the mainstream out of an outlet, as an after-bypass-passage flow,
the case has an outer wall surface configured to flow a part of the mainstream therealong, without passing through the bypass passage, as an outside-passage flow,
the outer wall surface of the case defines a throttle at a downstream of an opening of the outlet of the bypass passage relative to the mainstream, and
the throttle is configured to merge the after-bypass-passage flow with the outside-passage flow to generate a merged flow and to guide the merged flow to a downstream of the mainstream.

2. The airflow measuring device according to claim 1, wherein
the outer wall surface of the case defines an introduction passage at an upstream of the opening of the outlet relative to the mainstream, and the introduction passage is configured to guide the outside-passage flow toward the throttle.

3. The airflow measuring device according to claim 2, wherein the introduction passage is further configured to guide the outside-passage flow toward the throttle, while throttling the outside-passage flow.

4. The airflow measuring device according to claim 1, wherein
the case is equipped with two line-shaped projections projected from the outer wall surface of the case,
the two line-shaped projections define the throttle, and
the outer wall surface of the case and the two line-shaped projections partition a region in which the after-bypass-passage flow and the outside-passage flow are merged and are throttled.

5. The airflow measuring device according to claim 2, wherein
the case is equipped with two line-shaped projections projected from the outer wall surface of the case to surround the outlet,
the outer wall surface of the case define the throttle and the introduction passage, and
the outer wall surface of the case and the two line-shaped projections, at a downstream of the opening of the outlet relative to the mainstream, partition a region in which the after-bypass-passage flow and the outside-passage flow are merged and are throttled.

6. The airflow measuring device according to claim 4, wherein
the two line-shaped projections are bridged with a lid opposed to the outer wall surface of the case, and
the outer wall surface of the case, the two line-shaped projections, and the lid partition a region in which the after-bypass-passage flow and the outside-passage flow are merged and are throttled.

7. The airflow measuring device according to claim 4, wherein the two line-shaped projections are linearly inclined or curved, such that the two line-shaped projections get closer to each other toward a downstream of the mainstream thereby to define the throttle.

8. The airflow measuring device according to claim 4, wherein
the two line-shaped projections are bridged with a lid opposed to the outer wall surface of the case,
the outer wall surface of the case, the two line-shaped projections, and the lid partition a region in which the after-bypass-passage flow and the outside-passage flow are merged and are throttled, and
the lid is linearly inclined or curved, such that the lid gets closer to the outer wall surface of the case toward a downstream of the mainstream thereby to define the throttle.

* * * * *